(12) United States Patent
Briscoe (10) Patent No.: US 8,117,820 B1
(45) Date of Patent: Feb. 21, 2012

(54) JET ENGINE INTAKE DEFLECTOR SYSTEM

(76) Inventor: Edward V. Briscoe, Kenmare, ND (US)

( * ) Notice: Subject to any disclaimer, the term of this patent is extended or adjusted under 35 U.S.C. 154(b) by 519 days.

(21) Appl. No.: 12/471,996

(22) Filed: May 26, 2009

(51) Int. Cl.
*F02G 3/00* (2006.01)

(52) U.S. Cl. .................. 60/39.092; 60/779; 60/39.091; 415/121.2; 55/306; 244/53 B; 137/15.1

(58) Field of Classification Search .............. 60/39.092, 60/39.091, 779, 767; 415/121.2; 55/306; 137/15.1; 244/53 B
See application file for complete search history.

(56) References Cited

U.S. PATENT DOCUMENTS

| | | | |
|---|---|---|---|
| 2,944,631 A | 7/1960 | Kerry et al. | |
| 2,969,941 A | 1/1961 | Hobart, Jr. | |
| 3,121,545 A * | 2/1964 | Meletion | 244/53 B |
| 3,196,598 A * | 7/1965 | Olson | 55/306 |
| 3,871,844 A | 3/1975 | Calvin, Sr. | |
| 4,149,689 A | 4/1979 | McDonald | |
| 4,833,879 A | 5/1989 | Verduyn et al. | |
| 5,411,224 A | 5/1995 | Dearman et al. | |
| D433,029 S * | 10/2000 | Eidson | D12/345 |
| 6,138,950 A | 10/2000 | Wainfan et al. | |
| 6,536,202 B2 | 3/2003 | Lo | |
| 6,994,738 B2 * | 2/2006 | Taddey et al. | 55/306 |
| 2011/0011055 A1 * | 1/2011 | Troy | 60/39.092 |

* cited by examiner

*Primary Examiner* — William H Rodriguez
*Assistant Examiner* — Craig Kim
(74) *Attorney, Agent, or Firm* — Neustel Law Offices (57) ABSTRACT

A jet engine intake deflector system for preventing foreign objects from entering the intake of a jet engine. The jet engine intake deflector system generally includes an air intake frame, a plurality of fins and a deflection member. The air intake frame is generally comprised of a plurality of laterally extending outer supports arranged at equidistance from each other in a substantially circular configuration around a center support. Each fin is generally comprised of a flat plate, wherein a front end of each fin is attached to the deflection member and a rear end of each fin is attached to the air intake frame. The free end of the air intake frame is generally welded directly onto a jet engine to protect its intake from foreign objects, such as birds. Upon striking a foreign object, the deflector member will direct the foreign object out and away from the jet engine intake.

19 Claims, 7 Drawing Sheets

JET ENGINE INTAKE DEFLECTOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to jet engines and more specifically it relates to a jet engine intake deflector system for preventing damage to a jet engine from foreign objects, such as a bird or other wildlife.

2. Description of the Related Art

Any discussion of the related art throughout the specification should in no way be considered as an admission that such related art is widely known or forms part of common general knowledge in the field.

Since the advent of the modern jet engine, there have been numerous high profile accidents caused by a foreign object such as a bird entering the intake of a jet engine. The introduction of such a foreign object into the intake of a jet engine will typically render the jet engine inoperable, thus creating a dangerous situation for the passengers and crew onboard.

Previously designed systems for protecting jet engine intakes from foreign objects have been primarily comprised of screens which are placed over the intake of the jet engine. However, these existing protection screen systems do not include any type of deflection member for forcing the foreign object away from the jet engine intake after impact. The absence of such a deflection member on preexisting systems leaves open the possibility of portions of the impacted foreign object entering through the screen openings and intruding into the jet engine intake.

Because of the inherent problems with the related art, there is a need for a new and improved jet engine intake deflector system for preventing foreign objects such as bird from entering the intake of a jet engine and rendering it inoperable.

BRIEF SUMMARY OF THE INVENTION

The general purpose of the present invention is to provide a jet engine intake deflector system that has many of the advantages of the protective screens mentioned heretofore. The invention generally relates to a jet engine intake deflector system which includes an air intake frame, a plurality of fins and a deflection member. The air intake frame is generally comprised of a plurality of laterally extending outer supports arranged at equidistance from each other in a substantially circular configuration around a center support. Each fin is generally comprised of a flat plate which extends outwardly from the center support, wherein a front end of each fin is attached to the deflection member and a rear end of each fin is attached to the air intake frame. The free end of the air intake frame is generally welded directly onto a jet engine to protect its intake from foreign objects, such as birds.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Turning now descriptively to the drawings, in which similar reference characters denote similar elements throughout the several views, FIGS. 1 through 6 illustrate a jet engine intake deflector system 10, which comprises an air intake frame 20, a plurality of fins 30 and a deflection member 40. The air intake frame 20 is generally comprised of a plurality of laterally extending outer supports 24 arranged at equidistance from each other in a substantially circular configuration around a center support 22. Each fin 30 is generally comprised of a flat plate which extends outwardly from the center support 22, wherein a front end 32 of each fin 30 is attached to the deflection member 40 and a rear end 34 of each fin 30 is attached to the air intake frame 20. The free end of the air intake frame 20 is generally welded directly onto a jet engine 12 to protect its intake from foreign objects, such as birds.

B. Air Intake Frame.

Figure 1:
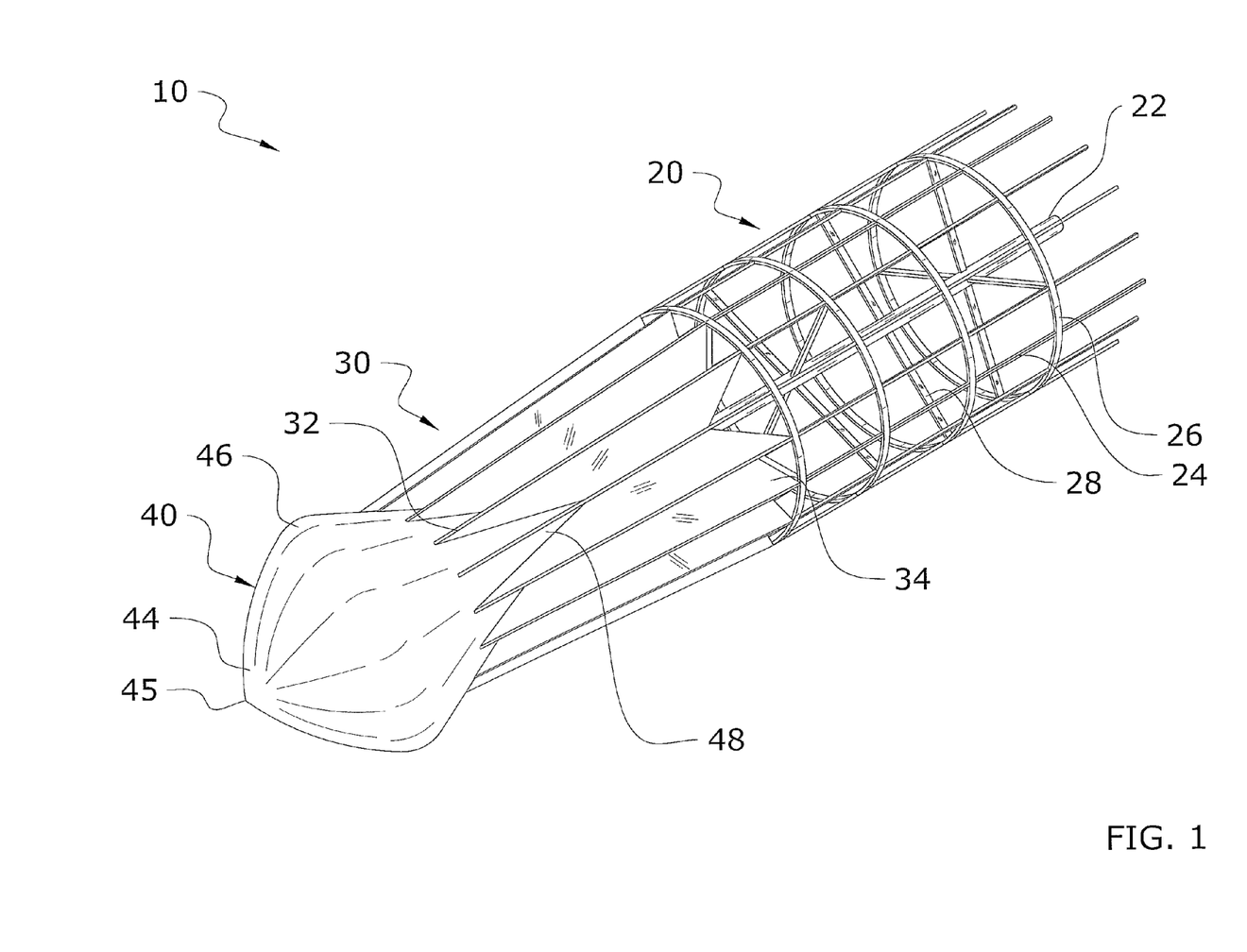
FIG. 1 is an upper perspective view of the present invention.

The air intake frame 20 of the present invention is generally attached directly to the jet engine 12 and comprised of a plurality of outer supports 24 arranged in a substantially circular configuration around a center support 22 as shown in FIG. 1. However, it is appreciated that the plurality of outer supports 24 of the air intake frame 20 may be arranged in various other configurations, including a square configuration, triangular configuration or the like.

Each of the outer supports 24 are preferably spaced equidistance from each other, though it is appreciated that various spacing arrangements may be utilized with the outer supports 24 so long as sufficient space is provided to allow airflow through the air intake frame 20 and into the jet engine 12.

The outer supports 24 of the present invention may be comprised of various types of elongated members, which, when assembled in a substantially circular configuration at equidistance from each other, create a plurality of air passageways to allow airflow into the intake of the jet engine 12. However, it is appreciated that the outer supports 24 of the present invention are preferably comprised of laterally extending rods.

It is further appreciated that the outer supports 24 may be comprised of any lightweight, durable material capable of withstanding exposure to high winds, extreme temperatures and various other elements common to an airplane. It is further appreciated that the outer supports 24 are preferably comprised of a material capable of withstanding direct hits from foreign objects such as birds without bending, warping or breaking. In a preferred embodiment, the outer supports 24 are comprised of a lightweight titanium material.

Figure 2:
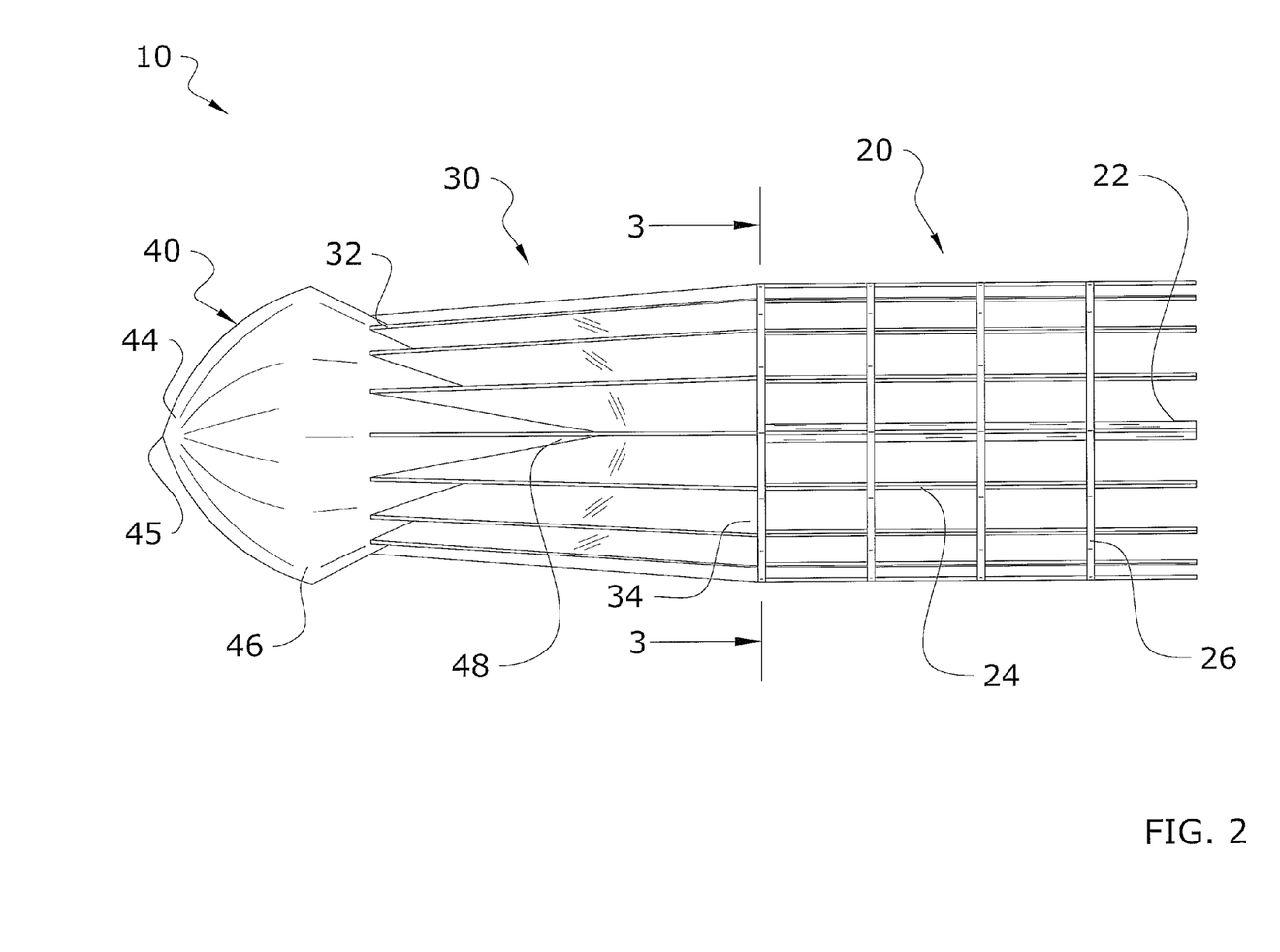
FIG. 2 is a side view of the present invention.

The center support 22 is generally comprised of a rigid, elongated member which connects directly to the deflection member 40 and serves as a connection point for the fins 30 and cross members 28 of the present invention. In a preferred embodiment, the center support 22 is comprised of a laterally extending rod. Though the center support 22 may comprised of any lightweight, durable material capable of withstanding exposure to high winds, extreme temperatures and various other elements common to an airplane, it is appreciated that a preferred embodiment of the center support 22 is comprised of a lightweight titanium material. The air intake frame 20 may also include one or more braces 26 for providing additional stability and support for the outer supports 24. The braces 26 of the present invention are generally comprised of circular ring members and serve to connect the outer supports 24 to each other as shown in FIG. 2. However, it is appreciated that the braces may be comprised of various other shapes to match the arrangement of the outer supports 24 in embodiments where the outer supports are not arranged in a circular configuration.

The braces 26 may be comprised of any lightweight, durable material capable of withstanding exposure to high winds, extreme temperatures and various other elements common to an airplane. It is further appreciated that the braces 26 are preferably comprised of a material capable of withstanding direct hits from foreign objects such as birds without bending, warping or breaking. In a preferred embodiment, the braces 26 are comprised of a lightweight titanium material.

The air intake frame 20 may also include one or more cross members 28 to provide further stability and support for the outer supports 24 and braces 26. In a preferred embodiment, each cross member 28 is comprised of a rod which extends from the center support 22 to a point on the inner circumference of a brace 26.

Figure 3:
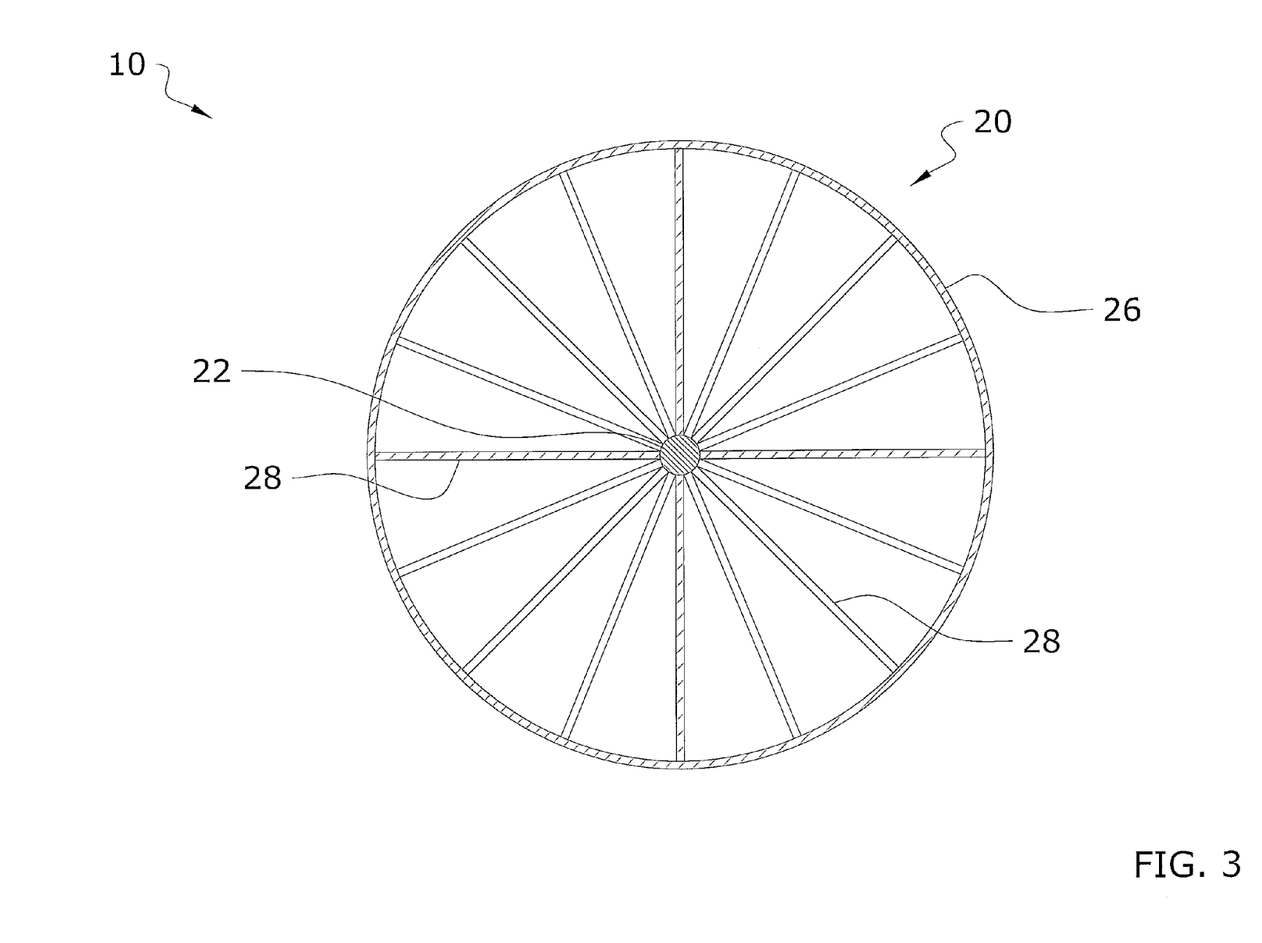
FIG. 3 is a front sectional view taken along line 3 of FIG. 2.

As shown in FIG. 1, it is preferable that each brace 26 includes four cross members 28 arranged at right angles to each other. However, it is appreciated that fewer or greater than four cross members 28 may be utilized with the present invention without affecting its overall operation, so long as sufficient stability and support is provided to the outer supports 24 and braces 26 to allow the air intake frame 20 to withstand direct impact with a foreign object at high speeds. In embodiments of the present invention utilizing multiple braces 26 each having a plurality of cross members 28, it is preferable that the braces 26 be arranged such that the cross members 28 are in a staggered arrangement as shown in FIG. 3, rather than directly in line with each other.

The cross members 28 of the present invention may be comprised of any lightweight, durable material capable of withstanding exposure to high winds, extreme temperatures and various other elements common to an airplane. It is further appreciated that the cross members 28 are preferably comprised of a material capable of withstanding direct hits from foreign objects such as birds without bending, warping or breaking. In a preferred embodiment, the cross members 28 are comprised of a lightweight titanium material.

Figure 6:
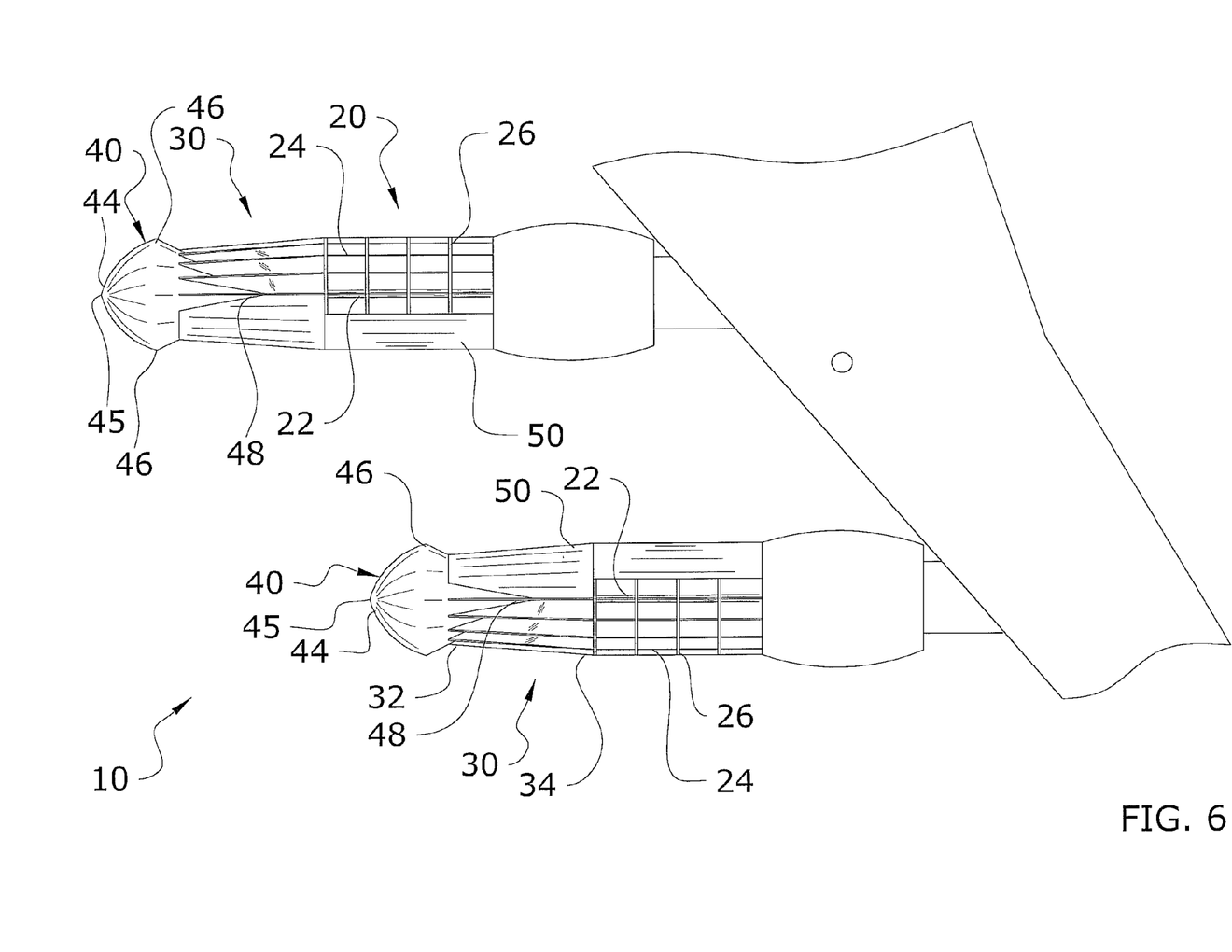
FIG. 6 is a close-up top view of the present invention installed on an airplane having multiple jet engines on a single wing.
Figure 7:
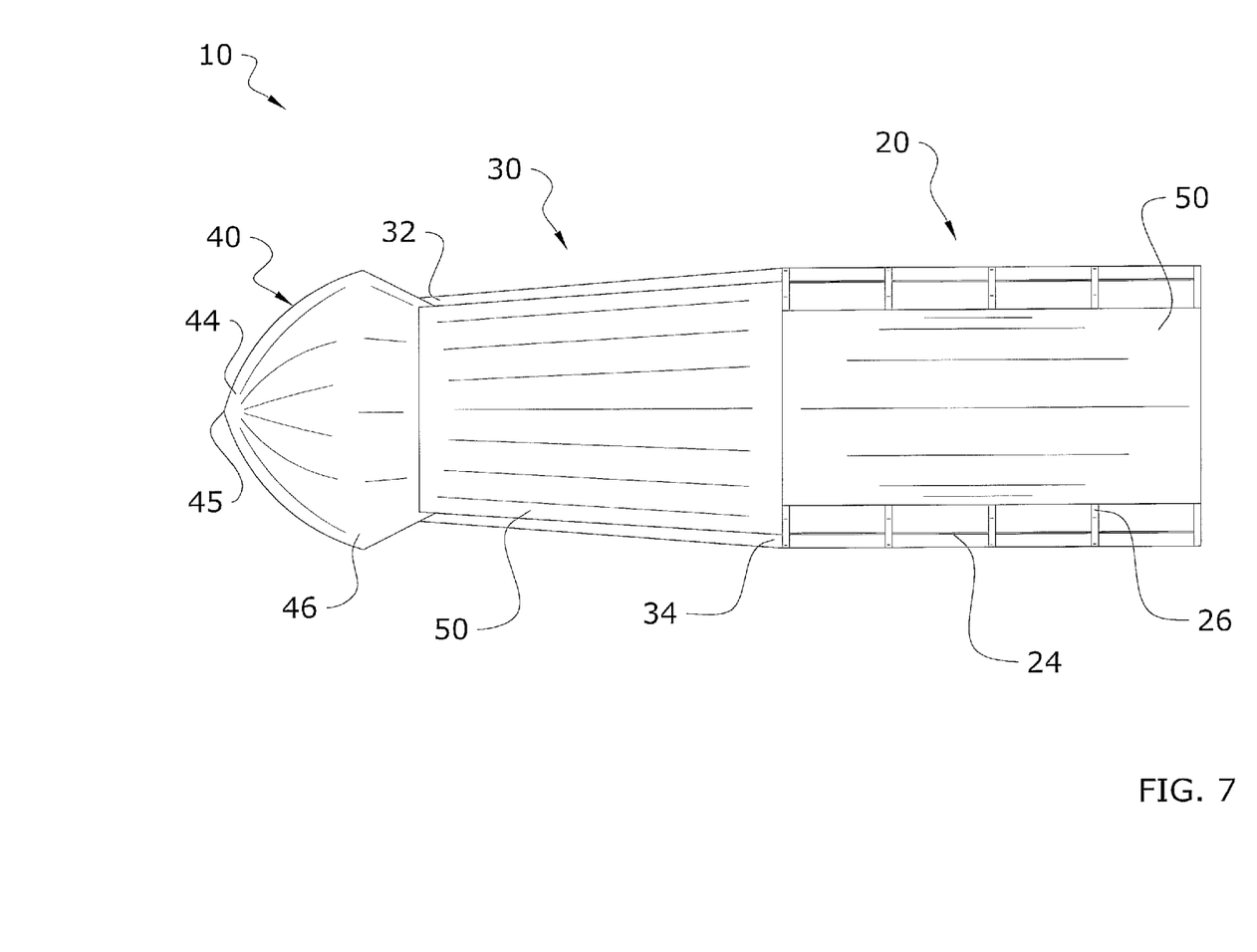
FIG. 7 is a side view of the present invention with debris guards installed over the air intake frame and fins.

The connection between the air intake frame 20 and the jet engine 12 is generally effectuated by welding the free end of each of the outer supports directly to the forward-facing outer rim of the jet engine 12 as illustrated in FIG. 6. However, it is appreciated that various other connection types may be utilized so long as the free end of the air intake frame 20 is firmly attached to the jet engine 12 such that the present invention will not break away when subjected to the impact of a foreign object such as a bird while in flight.

C. Fins.

The jet engine intake deflector system 10 generally includes a plurality of radially extending fins 30 for separating the air intake frame 20 from the deflection member 40 and for directing airflow through the air intake frame 20 and into the jet engine 12. Each fin 30 is generally comprised of a flat plate extending outwardly from the center support 22. The fins 30 of the present invention are generally spaced apart from each other as shown in FIG. 1 so as to create passages for air to traverse on its way through the air intake frame 20 and into the jet engine 12.

Each fin will generally have a front end 32 and a rear end 34. The front end 32 is generally attached directly to the deflection member 40. The rear end 34 of each fin 30 is generally attached directly to the air intake frame 20. In certain embodiments of the present invention, the rear end 34 of each fin 30 is attached directly to the end of an outer support 24. In a preferred embodiment as shown in FIG. 1, the rear end 34 of each fin 30 is attached directly to a brace 26.

The fins 30 may be comprised of any lightweight, durable material capable of withstanding exposure to high winds, extreme temperatures and various other elements common to an airplane. It is further appreciated that the fins 30 are preferably comprised of a material capable of withstanding direct hits from foreign objects such as birds without bending, warping or breaking. In a preferred embodiment, the fins 30 are comprised of a lightweight titanium material.

D. Deflection Member.

The present invention will generally include a deflection member 40 located at its forward-facing end as shown in FIG. 1. The deflection member 40 will generally be comprised of a solid structure having a solid surface which extends out from the front end 32 of the fins 30 and has a circumference which is greater than the circumference of the outer supports 24 and fins 30 when they are arranged in a circular configuration as shown in FIG. 1. It is preferably that the deflection member 40 includes solid outer surfaces to prevent small portions of deflected foreign objects from entering the air intake frame 20 and impacting the jet engine 12.

The deflection member 40 will generally include a front portion 44, front tip 45, central portion 46 and rear portion 48 as shown in FIG. 1. In a preferred embodiment, the deflection member 40 is comprised of a tear-drop shaped structure which extends forward from the fins 30 and has sloped forward-facing surfaces which, upon impacting a foreign object such as a bird, deflects the foreign object out and away from the jet engine intake deflector system 10 and jet engine 12. In such an embodiment, the central portion 46 of the deflection member 40 will generally be of a wide circumference, with the front portion 44 of the deflection member 40 tapering off to come to a point at the front tip 45. The rear portion 48 will generally extend in an opposite direction as the front portion 44 and be similarly tapered toward a rear tip 49, which will generally be attached to the center support 22.

However, it is appreciated that the deflection member 40 may be comprised of various shapes so long as foreign objects are directed out and away from the jet engine intake deflector system 10 and jet engine 12 so as to prevent portions of the foreign object from entering the air intake frame 20 and the jet engine 12.

The deflection member 40 may be comprised of any lightweight, durable material capable of withstanding exposure to high winds, extreme temperatures and various other elements common to an airplane. It is further appreciated that the deflection member 40 is preferably comprised of a material capable of withstanding direct hits from foreign objects such as birds without bending, warping or breaking. In a preferred embodiment, the deflection member 40 is comprised of a solid lightweight titanium material.

Figure 4:
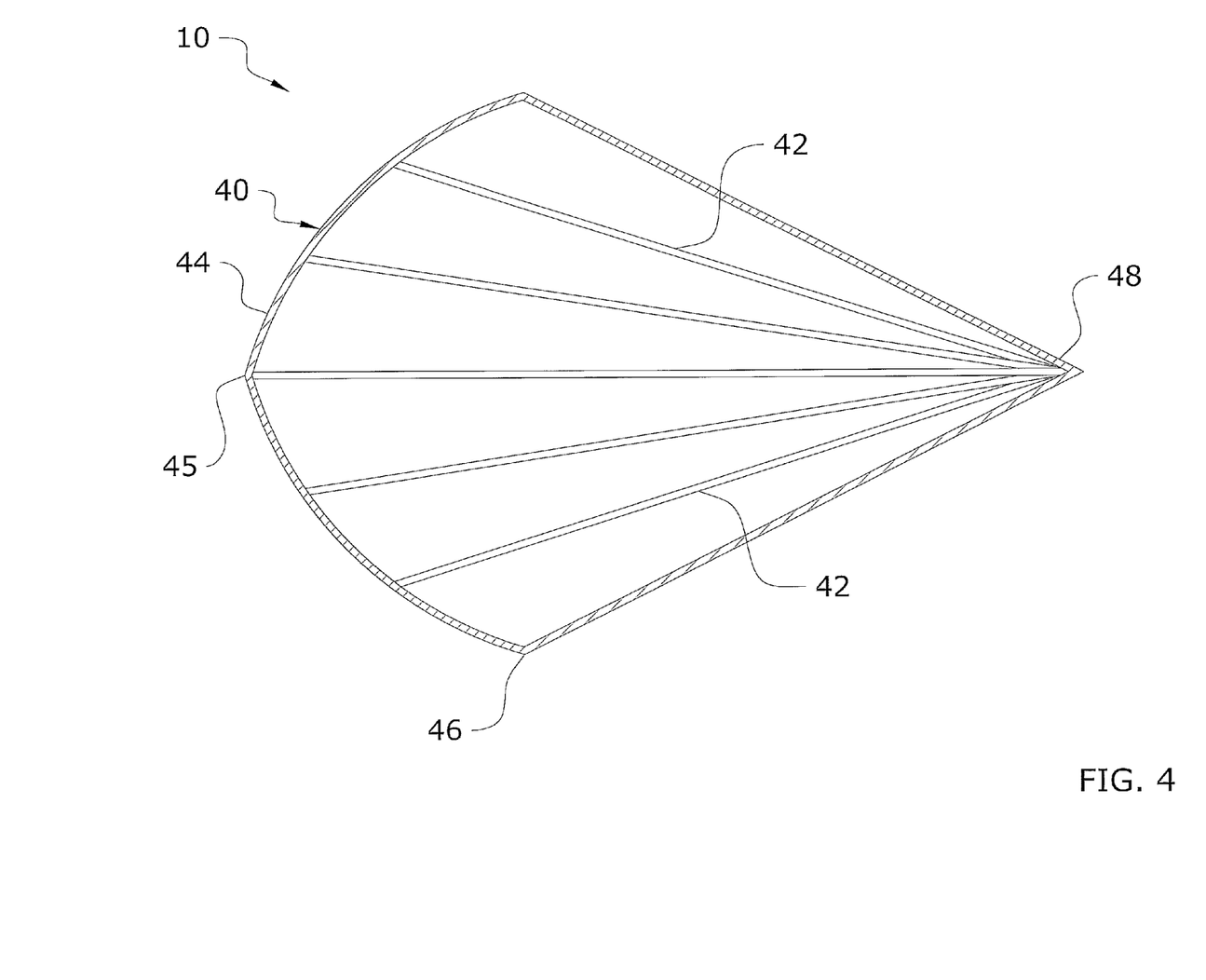
FIG. 4 is a side sectional view of the deflection member of the present invention.

While the deflection member 40 is generally solid, in a preferred embodiment the deflection member will include one or more reinforcement members 42 within its structure to provide further stability and support. As shown in FIG. 4, the reinforcement members 42 will generally be comprised of reinforcing rods which are positioned within the deflection member 40.

E. Debris Guards.

The jet engine intake deflector system 10 described herein will sometimes be utilized on aircraft having multiple jet engines 12 as shown in FIG. 6. In such an embodiment, there is a risk that foreign objects deflected from a first jet engine intake deflector system 10 on a first jet engine 12 will come into direct contact with the fins 30 or air intake frame 20 of a second jet engine intake deflector system 10 on a second jet engine 12. To prevent such occurrences, debris guards 50 will generally be included on jet engine intake deflector systems 10 which are used on multiple jet engine 12 aircraft.

The debris guard 50 will generally be comprised of a plate-like structure which covers the portions of the fins 30 and air intake frame 20 which face in the direction of a second jet engine intake deflector system 10 as shown in FIG. 6. The debris guard 50 may be comprised of any lightweight, durable material capable of withstanding exposure to high winds, extreme temperatures and various other elements common to an airplane. It is further appreciated that the debris guard 50 is preferably comprised of a material capable of withstanding direct hits from foreign objects such as birds without bending, warping or breaking. In a preferred embodiment, the debris guard 50 is comprised of a solid lightweight titanium material. It is also preferable that the debris guard 50 includes solid surfaces to prevent small portions of deflected foreign objects from entering the air intake frame 20.

F. Operation of Preferred Embodiment.

Figure 5:
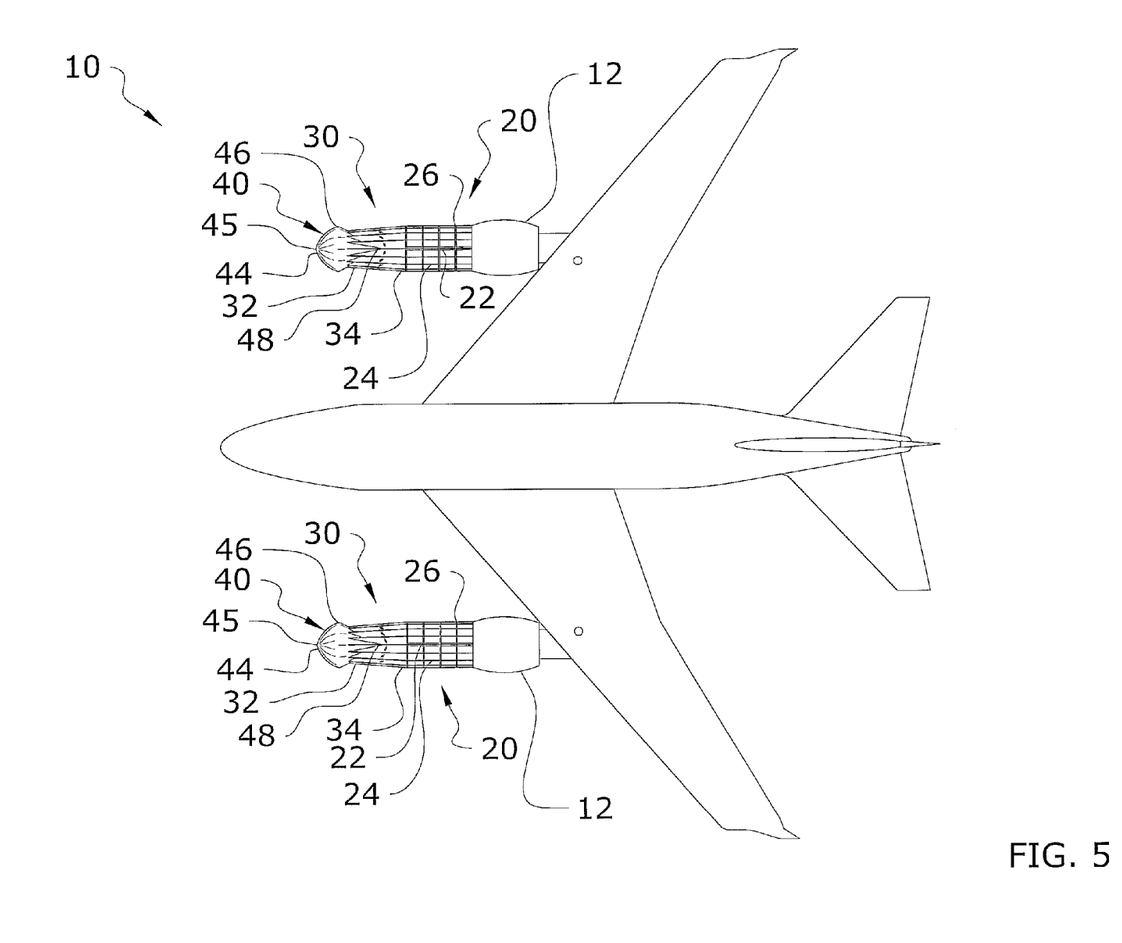
FIG. 5 is a top view of the present invention installed on an airplane.

In use, the free end of the air intake frame 20 will generally be firmly attached directly onto the outer rim of a jet engine 12. In a preferred embodiment as shown in FIG. 5, the free ends of the outer supports 24 are welded to the outer rim of the jet engine 12 such that the air intake frame 20 completed encloses the jet engine 12 intake. In aircraft having multiple jet engines 12 on a single wing, a debris guard 50 will generally be positioned over the portions of each jet engine intake deflector system 10 which face a second jet engine intake deflector system 10.

When in flight, air is directed through the fins 30 and air intake frame 20 into the jet engine 12. Upon striking a foreign object such as a bird, the deflector member 40 will direct the foreign object out and away from the present invention, thus preventing damage to the jet engine 12. The foreign object will generally impact the deflection member 40 at either its front portion 44 or front tip 45. Upon impact, the sloped front portion 44 or front tip 45 will generally force the foreign object out and away from the jet engine 12. In the event the foreign object is deflected in the direction of a second jet engine 12, it will strike the debris guard 50 and bounce away.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A jet engine intake deflector system, comprising:
   a center support;
   a plurality of fins extending outwardly from said center support, wherein each of said plurality of fins includes a front end and a rear end;
   an air intake frame, wherein said air intake frame is attached to said rear end of said plurality of fins, and wherein said air intake frame is comprised of a plurality of outer supports arranged in a circular configuration around said center support;
   a deflection member, wherein said deflection member is attached to said front end of said plurality of fins, and wherein said deflection member includes a central portion, wherein said central portion is of a circumference greater than the circumference of said plurality of outer supports.

2. The jet engine intake deflector system of claim 1, wherein each of said plurality of outer supports is comprised of a laterally extending rod, wherein each of said laterally extending rods is attached to said rear end of said plurality of fins.

3. The jet engine intake deflector system of claim 2, wherein said air intake frame includes at least one brace, wherein said at least one brace is comprised of a ring member, wherein each of said laterally extending rods is attached to said ring member.

4. The jet engine intake deflector system of claim 3, wherein a plurality of cross members attaches said at least one brace to said center support.

5. The jet engine intake deflector system of claim 1, wherein each of said plurality of fins is comprised of a flat plate extending outwardly from said center support.

6. The jet engine intake deflector system of claim 5, wherein said front end of each of said plurality of fins is attached to said deflection member, wherein said rear end of each of said plurality of fins is attached to said air intake frame.

7. The jet engine intake deflector system of claim 1, wherein said deflection member has a substantially solid outer surface.

8. The jet engine intake deflector system of claim 7, wherein said deflection member is comprised of a teardrop shape.

9. A jet engine intake deflector system, comprising:
a first jet engine, wherein an air intake frame is attached to said first engine;
a center support, wherein said air intake frame is comprised of a plurality of outer supports arranged in a circular configuration around said center support;
a plurality of fins extending radially outwardly from said center support, wherein each of said plurality of fins includes a front end and a rear end, wherein said air intake frame is attached to said rear end of said plurality of fins;
a deflection member extending forward from said front end of said plurality of fins, wherein said deflection member is comprised of a substantially sold outer surface, and wherein said deflection member includes a central portion, wherein said central portion is of a circumference greater than the circumference of said plurality of outer supports;
a second jet engine; and
a debris guard extending over a portion of said air intake frame which faces in the diction of said second jet engine.

10. The jet engine intake deflector system of claim 9, wherein said deflection member includes one or more reinforcement members.

11. The jet engine intake deflector system of claim 9, wherein each of said plurality of outer supports is comprised of a laterally extending rod, wherein each of said laterally extending rods is attached to said rear end of said plurality of fins.

12. The jet engine intake deflector system of claim 11, wherein said air intake frame includes at least one brace.

13. The jet engine intake deflector system of claim 12, wherein said brace is comprised of a ring member, wherein each of said laterally extending rods is attached to said ring member.

14. The jet engine intake deflector system of claim 13, wherein a plurality of cross members attaches said at least one brace to said center support.

15. The jet engine intake deflector system of claim 14, wherein each of said plurality of fins is comprised of a flat plate extending outwardly from said center support.

16. The jet engine intake deflector system of claim 15, wherein said front end of each of said plurality of fins is attached to said deflection member, wherein said rear end of each of said plurality of fins is attached to said air intake frame.

17. The jet engine intake deflector system of claim 9, wherein said deflection member is comprised of a teardrop shape.

18. The jet engine intake deflector system of claim 9, wherein said debris guard extends over a portion of said plurality of fins which faces in the direction of said second jet engine.

19. A jet engine intake deflector system, comprising:
a first jet engine;
a second jet engine;
an air intake frame attached to said first jet engine,
a center support;
a plurality of fins extending outwardly from said center support;
wherein each of said plurality of fins includes a front end and a rear end, wherein each of said plurality of fins is comprised of a flat plate extending radially outward from said center support;
wherein said air intake frame is attached to said rear end of said plurality of fins;
wherein said air intake frame is comprised of a plurality of outer supports arranged in a circular configuration around said center support, wherein each of said plurality of outer supports is comprised of a laterally extending rod, wherein each of said laterally extending rods is attached to said rear end of said plurality of fins;
wherein said air intake frame includes at least one brace, wherein said at least one brace is comprised of a ring member, wherein each of said laterally extending rods is attached to said ring member;
wherein a plurality of cross members attaches said at least one brace to said center support, wherein the free end of said air intake frame is welded onto the outer rim of a jet engine;
a deflection member extending forward from said front end of said plurality of fins, wherein said deflection member is comprised of a teardrop shape having a central portion, a front portion, a rear portion and a front tip;
wherein said central portion of said deflection member is of a circumference greater than that of said brace;
wherein said deflection member includes one or more reinforcement members, wherein said deflection member is comprised of a substantially solid surface;
wherein upon striking a foreign object, said deflection member directs said foreign object out and away from said air intake frame; and
a debris guard, wherein said debris guard extends over a portion of said air intake frame which faces said second engine, wherein said debris guard extends over a portion of said plurality of fins which faces said second engine.

* * * * *